Jan. 6, 1925. 1,521,806
H. E. ELROD
AUTOMOBILE SIGNAL
Filed April 13, 1922 3 Sheets-Sheet 2
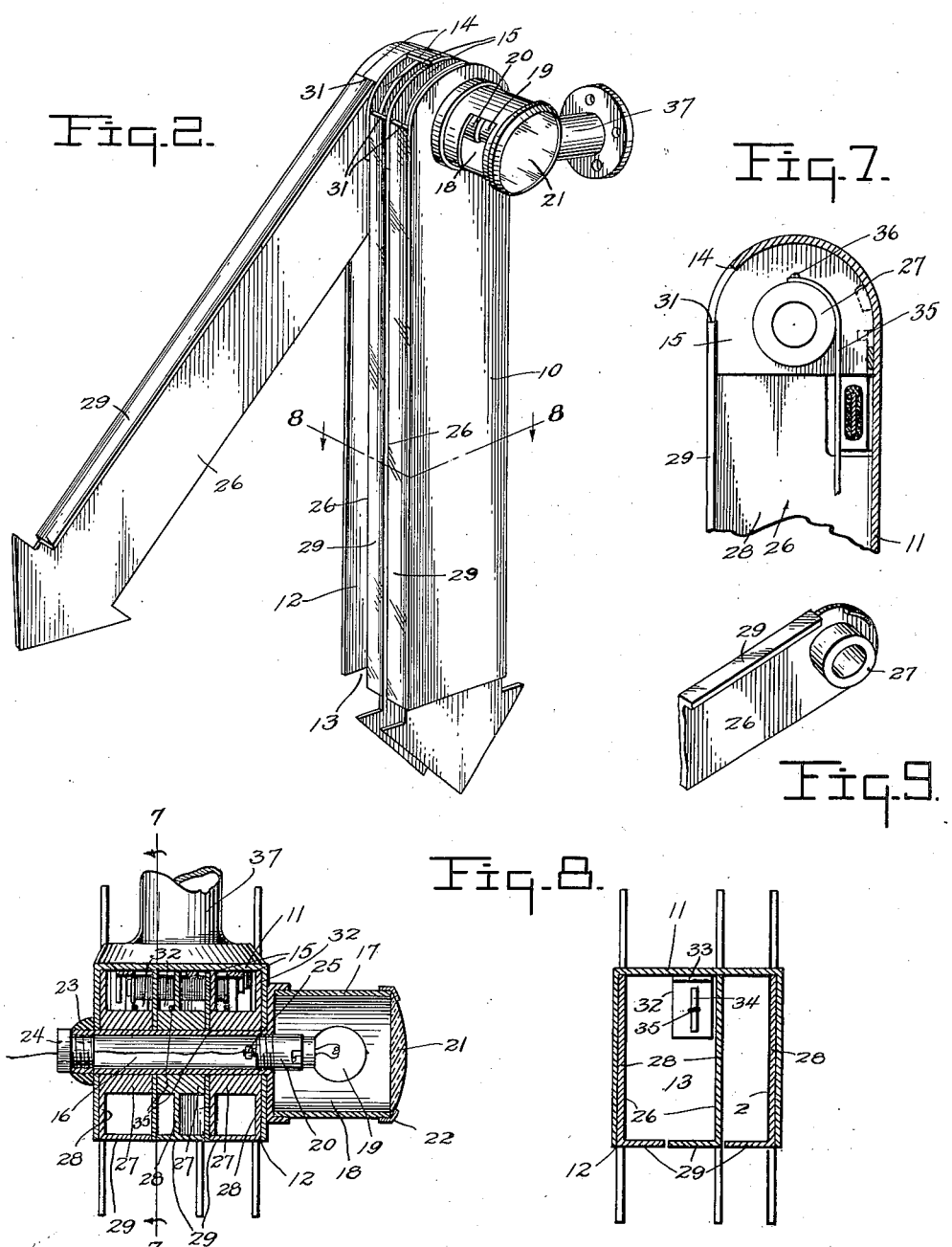

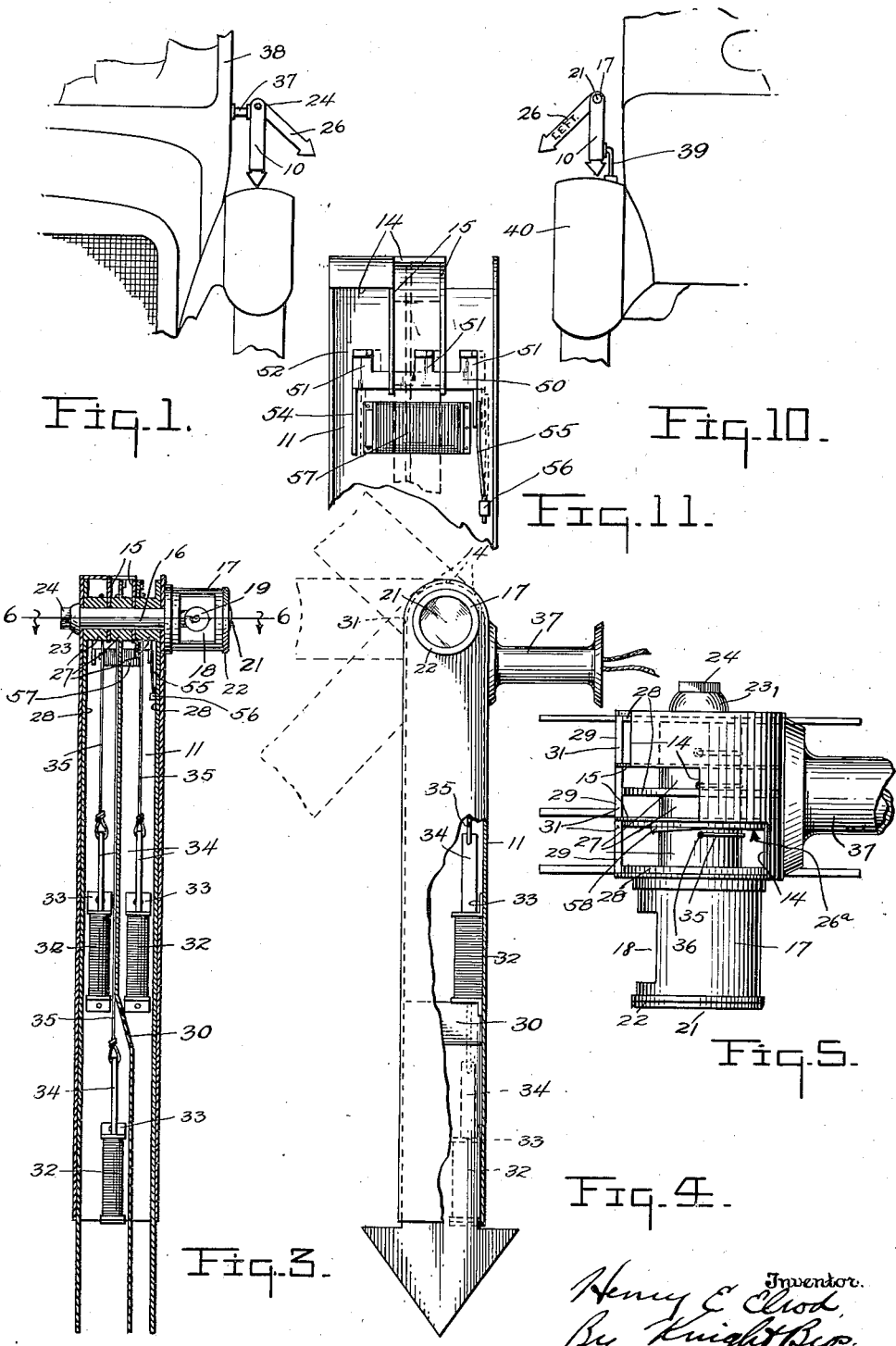

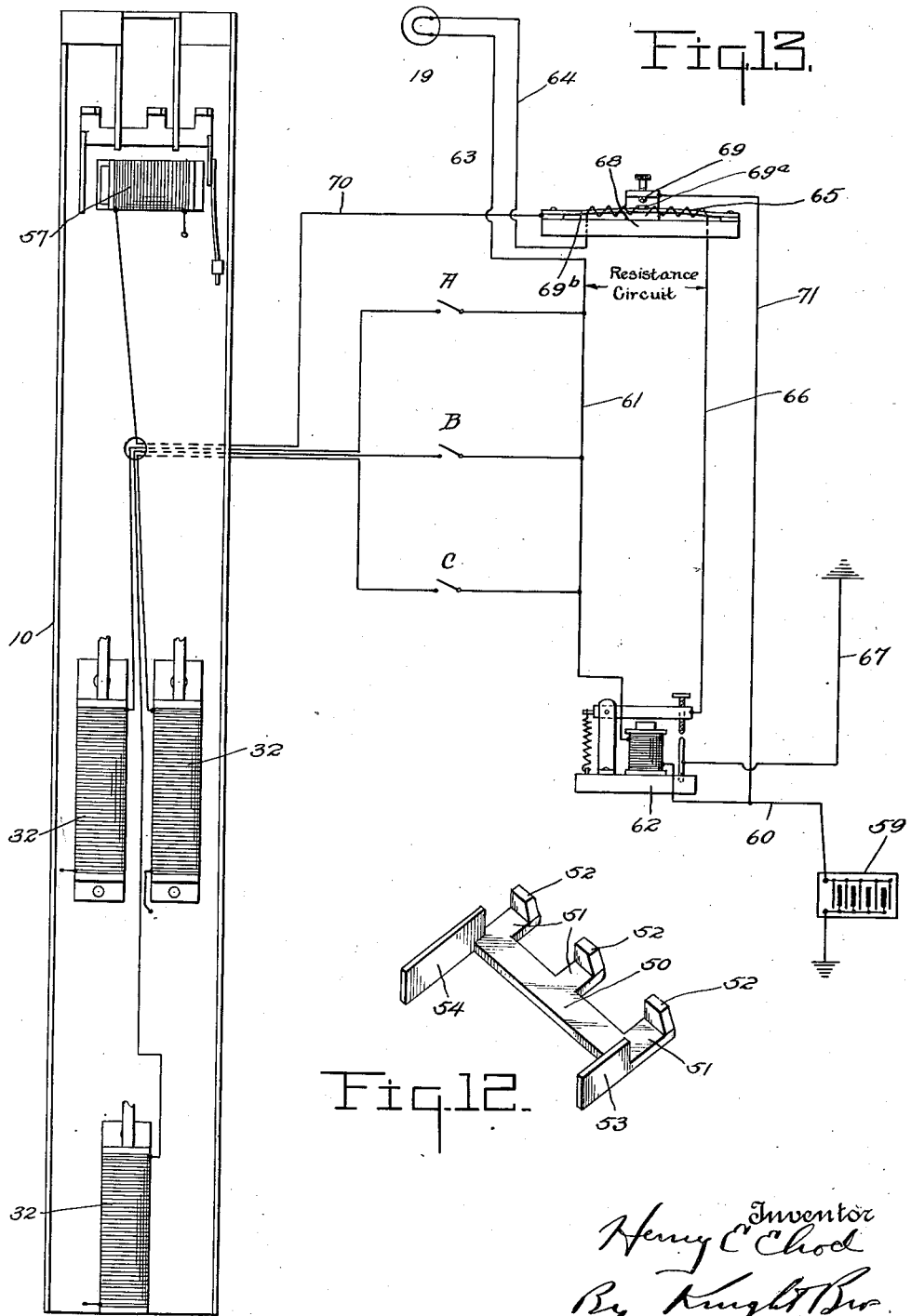

Patented Jan. 6, 1925.

UNITED STATES PATENT OFFICE.

HENRY E. ELROD, OF DALLAS, TEXAS.

AUTOMOBILE SIGNAL.

Application filed April 13, 1922. Serial No. 552,111.

*To all whom it may concern:*

Be it known that I, HENRY E. ELROD, a citizen of the United States, and a resident of Dallas, in the county of Dallas and State of Texas, have invented certain new and useful Improvements in an Automobile Signal, of which the following is a specification.

My invention relates to automobile signals and particularly to a signalling or indicating device which will indicate the intention of the driver of an automobile or the like, to which the same is attached.

An object of my invention is to provide an arrangement of this character which will be simple in construction, simple and positive in operation and which will furthermore, be of a decorative nature so as not to detract from the attractiveness of the vehicle to which it is attached.

In carrying out my invention, I provide a casing or housing within which is suitably mounted semaphore arms. These arms are adapted to be moved to different angular positions thereby bringing to view the words "Right," "Left" and "Stop." Means within the control of the driver is provided whereby any of the arms may be extended, the arms thereafter dropping by gravity.

Heretofore the principal objection to electric automobile accessories is that they consume too much current from the batteries of the car, particularly in cases where continuous current is required, as the current is frequently left connected, by accident, oversight or neglect, thus running the batteries down. Therefore, my invention contemplates means whereby the possibility of leaving the signalling device connected to the batteries is obviated and a mechanical latching device is provided which functions to hold the several signal arms in their raised or operative position.

Another feature of my improved construction is that of providing automatic means whereby the control mechanism of the signalling device will automatically disconnect itself at the termination of a predetermined time. In this present instance this is accomplished by means of an electric thermostatic device included in a resistance circuit whereby at the end of a variable predetermined period the main circuit will be cut out whereby all of the control mechanism will return to its normal position, so that the signal may be ready for use again.

Other advantages consist in the novel construction and arrangement of parts hereinafter more fully described and illustrated in the accompanying specification and drawings in which:

Fig. 1 is an elevation of a portion of a motor vehicle with my improved signal attached thereto, Fig. 2 is a detail perspective view of the device detached, Fig. 3 is a vertical transverse section through the device, Fig. 4 is a side elevation of the same partly in section, Fig. 5 is a top plan view, Fig. 6 is a section taken on line 6—6 of Fig. 3, looking in the direction of the arrows, Fig. 7 is a fragmentary section taken on the plane indicated by lines 7—7 in Fig. 6.

Fig. 8 is a section taken on the plane indicated by line 8—8 in Fig. 2, all the semaphore arms being herein shown housed, Fig. 9 is a fragmentary perspective view of one of the semaphore arms.

Fig. 10 is a rear elevation of a motor vehicle showing my improved signal as attached to the rear thereof, Fig. 11 is a fragmentary view of the casing showing the latch mechanism, Fig. 12 is a detail perspective view of the latch, and, Fig. 13 is a diagrammatic view showing the electric circuits employed in controlling the device.

Referring now more particularly to the drawings wherein like reference characters refer to like parts, the numeral 10 indicates a casing or housing which is substantially U-shaped in cross-section and is formed with a back 11. The front 12 is open as is one end thereof which I will hereinafter term the bottom 13. The back 11 extends up around the upper end of the housing 10 and the edge thereof is cut away to form stops 14 arranged in different planes. The upper end of the casing 10 is further provided with two short division plates 15.

The upper end of the housing 10 is apertured to receive a tubular shaft 16 to one end of which there is integrally attached a lamp box 17. This lamp box is formed with an opening 18 so arranged as to direct the rays of light from an electric bulb 19 onto the semaphore arms or arrows to be later explained. A socket 20 for the electric light bulb 19 is screw-threaded into the tubular shaft 16 as clearly illustrated in Fig. 6. A removable red lens 21 is placed in the end of the lamp box 17 and is held thereto by a spring clamping ring or the like 22. The current is supplied to the bulb 19 when one of the arms has been swung to operative position in a manner to be more fully hereinafter described. The other end of the tubular shaft 16 is externally screw-threaded to receive a clamping nut 23 by which the shaft is fixed to the casing 10 and internally threaded to receive an insulating collar 24 or the like, through which passes the wire for the electric light, the end of which wire is attached to a binding post or terminals 25.

In this illustrative example of my invention, I pivotally support within the housing 10, three semaphore arms in the form of arrows 26. Each arm is apertured at one end thereof and around this opening there is formed a boss or collar 27. The two outer arrows have bosses 27 extending from one side of their body portion 28 in the direction of the center of the housing 10 while the center arrow 26 has its boss 27 extending from both sides of the body portion 28 thereof, all of which is clearly illustrated in Fig. 6. The right-hand semaphore arm 26 is provided with a disc 26ª, formed onto the boss 27 and lying adjacent one of the division plates 15.

The body portion 28 of each semaphore arm 26 is arrow-shaped at its outer or free end and for the purpose of stiffening the body of each of the arms or arrows 26, and for the further purpose of closing the open side 12 of the casing, I form flanges 29 extending practically the entire length of each arrow and along one edge thereof. Each of the two outside arrows has this flange formed preferably by bending over at right angles thereto the body portion 28 while the centrally disposed arrow has its flange 29 extending from both sides of the body portion 28 throughout most of its length. However, toward the free end of the center arrow the body portion 28 is bent as indicated at 30 in Figs. 3 and 4 to form an offset for the purpose of clearing a solenoid to be later described. However, the flange 29 of this central arrow extends parallel its entire length, thus, together with the flanges 29 of the other two arrows closing the open side of the housing 10.

The flanges 29 are terminated as at 31 thus forming stop surfaces which cooperate with the stops 14 formed on the casing for the purpose of limiting the movement of the arrows 26.

Disposed within the casing or housing 10 are solenoids 32, one being provided for each of the arrows 26, as best shown in Figs. 3 and 4, these solenoids may be secured to the housing 10 by means of brackets 33 or the like. To the core 34 of each solenoid I secure one end of a flexible cable 35, the other end of which passes around the boss 27 of the aligned arrow and is secured thereto by means of a screw 36 or the like. Obviously, therefore, when a solenoid is energized and the core thereof retracted, the longitudinally pull exerted upon the attached cable 35 rotates the attached arrow around the tubular shaft 16, this movement of the arrow being arrested by engagement of the stop surfaces 14 and 31. Obviously, owing to the stepped position of the stop surfaces 14, the arrows may each be swung to a different position radially of their pivot 16.

In order to retain the semaphore arms 26 in their raised position without requiring current to be continuously supplied to the solenoid 32, I provide a latching mechanism. The latching mechanism comprises a latch-plate 50 (see particularly Figs. 11 and 12) formed with three latch arms 51, each of which carries an upstanding lug 52. Preferably formed integrally with the plate 50 at one side thereof is a lug 53 and at the other side thereof an armature 54. The lug 53 is engaged by a spring 55 secured to the back of the housing as at 56. The tendency of the spring 55 is to move the latch-plate 50 to the left as shown in full lines in Fig. 11. Also mounted within the housing is a magnet 57 which acts upon the armature 54 to move the latch-plate 50 to the right as viewed in Fig. 11 and against the action of spring 55.

Carried by each semaphore arm 26 is a beveled latch-lug 58 which as the arm is moved to its raised position, bears against the associated upstanding lug 52 of the latch-plate and moves the latch-plate to the right against the tension of the spring 55 a sufficient distance to enable the beveled latch-lug to snap behind the upstanding lug 52. Inasmuch as these arms tend to drop by gravity to their position in which they are contained within the housing or casing 10, the latch-lug 58 remains in engagement with the associated upstanding lug 52 until the magnet 57 has been energized, whereupon the raised arm is released and drops by gravity into its inoperative position. The disc 26ª carried by the semaphore arm at the right is provided for mounting the associated latch-lug 58, these lugs being secured to the body portion of the other two semaphore arms and arranged in a circumferential stepped relation with one another. Therefore as each semaphore arm reaches the end of its upward travel its associated latch-lug engages behind the associated upstanding lug of the latch-plate, thereby holding each semaphore arm in its raised position.

For mounting the casting upon a vehicle, I provide in the first instance a bracket 37 fixed to the back 11 of the casing 10 and adapted to be bolted to the body 38 of the vehicle. When it is found desirable to mount the indicator on the mudguard, an angularly bent bracket 39 is employed, one end of which is permanently fixed to the back 11 of the housing and the other end bolted or otherwise secured to a mudguard 40 of the vehicle.

Obviously if it is found desirable, the three arrows 26 may have displayed thereon the word "Left," "Stop" and "Right," the arrow which in its raised position points downwardly, displaying the word "Left" and the arrow which extends horizontally displaying the word "Stop" and the arrow which is moved the greatest distance displaying the word "Right."

By referring to Fig. 13 wherein the controlling circuits of the device are diagrammatically illustrated, the manner of operation of the device will be made more apparent. The solenoids 32 and the magnet 57 are each grounded whereby the one wire system of electrical transmission is employed. For closing the circuit to each of the solenoids 32 there is provided switches A, B and C which may be of any suitable type or construction. Then let it be assumed that the solenoid farthest to the left in Fig. 13 is to be energized and its associated semaphore arm raised. To accomplish this, the switch A is momentarily depressed thus completing a circuit from the battery 59, wire 60, through a magnetic device to be later described, wire 61, across switch A to the solenoid 32 which as hereinafter stated, is grounded. Thereupon the solenoid is energized and the associated semaphore arm raised. The switch A need only be momentarily depressed inasmuch as the latch mechanism hereinbefore described then functions to hold the semaphore arm in its raised position.

The circuit just established includes a magnetic contact device 62, which may also be of any type or construction and preferably a compact commercial magnetic contact device. The closing of the circuit thus described therefore energizes the magnet of this magnetic switch device and closes what is herein termed the resistance circuit which includes a wire 63 extending up to the light 19, a return wire 64, which is connected to a resistance coil 65, a return wire 66 leading to the magnetic contact device 62 and a wire 67 completing the circuit by grounding the same.

Therefore upon energization of the magnetic contact device 62 the resistance circuit is closed which circuit includes the light 19 and the resistance coil 65. The resistance coil 65 forms the resistance element of an electric thermostatic switch similar to that illustrated in U. S. Patent No. 1,150,001. This thermostatic switch 68 embodies a stationary contact 69 which is adapted to be engaged by a contact 69$^a$ carried by a thermostatic switch member or strip 69$^b$ upon which the resistance coil 65 is wound. The heat generated by the resistance coil 65 causes the thermostatic strip 69$^b$ to expand and bend centrally thereof which causes contact 69$^a$ to engage contact 69. A wire 70 leads from the contact 69$^a$ to the magnet 57 while a second wire 71 connected to the stationary contact 69 completes the circuit by cutting in on the main wire 60 running from the battery.

Therefore, when the thermostatic member 69$^b$ has expanded to cause an engagement of the contact carried thereby with the stationary contact 69, the circuit 59, 60, 71, 69, 69$^a$, 70 and 57 is established and the magnet 57 thus energized. This moves the latch 50 to the right and releases the raised semaphore arm whereupon this arm falls by gravity to its inoperative position. At the same time inasmuch as the current has been cut around the magnetic contact device 62, the magnet releases its armature and the spring associated with this magnetic contact device disengages the contacts and breaks the resistance circuit. The thermostatic device 69$^b$ thereupon cools and contracts breaking circuit 60, 71, 69, 69$_a$, 70 and 57 whereupon the parts return to their normal position so that the signal device may be again operated.

Obviously so far as the operator is concerned the operation of the signal is nearly entirely automatic inasmuch as the only manual operation necessary is that of momentarily depressing one of the switches A, B or C and in this connection these switches may be spring switches. The closing of this switch as described causes the energization of the solenoid which in turn raises the arm and the arm is then held by the mechanical latch means. Thereupon the resistance circuit is energized and the light 19 which illuminates the arrows is lighted and stays lighted until by reason of the operation of the thermostatic switch device the circuits are broken and the parts return to normal position. Obviously, by regulating the set-screw forming a part of the stationary contact 69 the time required for the contacts to close may be pre-determined and thus caused to operate at the end of the desired period of time.

While the embodiment of my invention shown and described herein operates efficiently, I do not wish to be unnecessarily limited as to details of construction, but reserve the right to make such changes in form, construction and arrangements of parts as may be found expedient under varying conditions and as may come within the purview of the accompanying claims.

Having thus described my invention what I claim is:

1. In a device of the class described, a signal, means mounting said signal permitting movement from a normal to a signalling position, electro-magnetic means for moving said signal from normal to signalling position, electro-magnetic latching means for holding said signal in the last named position, a retarded circuit closer in circuit with said latching means and means for setting said retarded circuit closer into operation to close the circuit of the latching means upon the operation of the signal moving means.

2. In a device of the class described, a signal, means for mounting said signal permitting movement from a normal to a signalling position, electro-magnetic means for moving said signal from normal to signalling position, electro-magnetic latching means for holding said signal in the last named position, a retarded circuit closer in circuit with said latching means and a circuit including a light for setting said retarded circuit closer into operation to close the circuit of the latching means upon the operation of the signal moving means.

3. In a device of the class described, a signal, means mounting said signal permitting movement from a normal to a signalling position, electro-magnetic means for moving said signal from normal to signalling position, electro-magnetic latching means for holding said signal in the last named position, a retarded circuit closer in circuit with the latch operating means and electrical means including a signal illuminating light for setting said retarded circuit closer into operation to close the circuit of the latching means upon the operation of the signal moving means.

HENRY E. ELROD.